Figure 1:
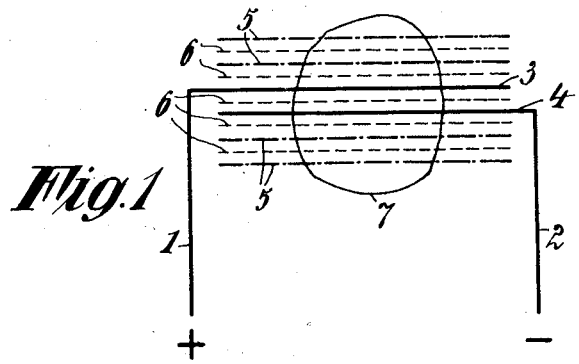

Feb. 3, 1931. H. THIRRING 1,790,850
SELENIUM CELL
Filed Jan. 24, 1930

INVENTOR
Hans Thirring
by [signature]
Attorney

Patented Feb. 3, 1931

1,790,850

UNITED STATES PATENT OFFICE

HANS THIRRING, OF VIENNA, AUSTRIA, ASSIGNOR TO "SELENOPHON" LICHT- UND TONBILDGESELLSCHAFT M. B. H., OF VIENNA, AUSTRIA

SELENIUM CELL

Application filed January 24, 1930, Serial No. 423,138, and in Austria February 9, 1929.

This invention relates to selenium cells of the condenser type having two or two series of parallel conductive plates insulated from each other by mica plates of which one or one series respectively is electrically connected to the one and the other, or other series respectively, is electrically connected to the other supply wire. To the end face suitably ground of a block consisting of such plates set on edge, molten selenium is applied in a thin layer and then sensitized by thermic treatment in the known manner.

It has already been proposed to make the conductive plates of a material capable of being wetted by molten selenium such as copper or gold in order that the molten selenium may better adhere to the plates and the thickness of the selenium layer on the end face of the block may be reduced, the sensitization of this layer may be facilitated and the sensitivity of the cell to light may be increased. Now in such cells, operating very well in all other respects, it was observed that their life is strikingly short. On close investigation of this phenomenon it was found that the metals capable of being wetted by molten selenium have also a more or less great affinity for selenium so that selenides of these metals are formed. The electric conductivity of these selenides is considerably greater than that of illuminated selenium and besides the selenide formation progresses in the selenium layer as if the metal dissolved progressively in the selenium. Consequently as the selenide formation progresses, the sensitivity of the selenium cell to light decreases and finally ceases when a selenide bridge has formed between adjacent conductive plates connected to opposite supply wires.

In the case of some metals capable of being wetted by molten selenium such as silver, the selenide formation progresses so rapidly that the cell will be short circuited even before the process of sensitization is finished, whereas in the case of other metals capable of being wetted by molten selenium such as gold or copper the progress of selenide formation is so slow that the life may be several months or even years.

In the case of plates of metals not capable of being wetted by molten selenium such as platinum, nickel or brass a deleterious selenide formation is perceivable only after a comparatively long time if at all.

The object of this invention is to increase the life of selenium cells which comprise conductive plates capable of being wetted by molten selenium. With this object in view conductive plates capable of being wetted by molten selenium as well as plates not capable of being wetted by molten selenium are employed and the essence of the invention consists in that the plates not capable of being wetted by molten selenium are connected to the supply wires and constitute the electrodes while the plates capable of being wetted by molten selenium are arranged at the sides or between the plates not capable of being wetted by molten selenium and are not in direct electric connection with the supply wires.

The plates capable of being wetted by molten selenium have for their effect that the molten selenium applied to the block is soaked in by capillary action and thereby the thickness of the selenium layer is reduced to an extent securing the desired sensitivity to light while the plates not capable of being wetted by molten selenium greatly retard the progress of the selenides and thereby increase the life of the cells.

Figure 2:
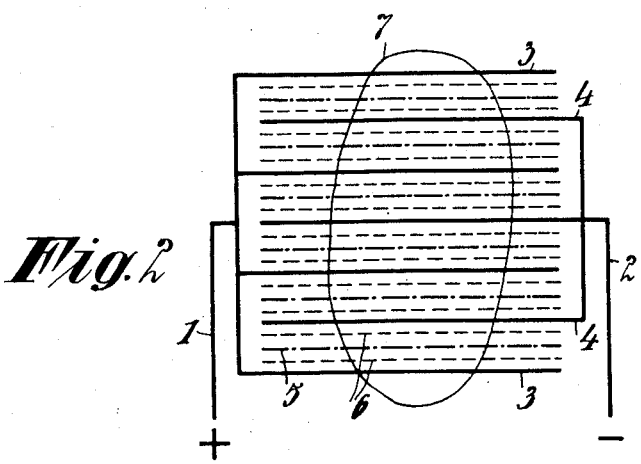
Figure 3:
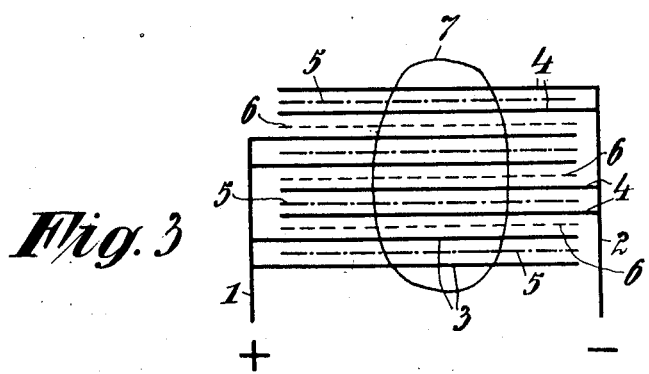

In the drawings Figs. 1, 2 and 3 show in diagrammatical plane views on an enlarged scale examples of embodiments of the invention.

In all the figures 1 and 2 designate the supply wires, the full lines 3, 4 the conducting plates not capable of being wetted by molten selenium and directly connected to the supply wires and serving as electrodes. 5 are the conducting plates capable of being wetted by molten selenium and indicated by dash and dot lines. The dotted lines 6 indicate the insulating mica plates and the line 7 indicates the outline of the selenium layer of the cell.

In Fig. 1 only one of each of the conducting plates 3, 4 not capable of being wetted by molten selenium and serving as an electrode is shown. These two plates are insulated from each other by a mica plate 6. Outside the pair of plates 3, 4 are arranged plates 5 capable of being wetted by molten selenium which are insulated from each other and from the plates 3, 4 by mica plates 6 and which serve for reducing the thickness of the selenium layer 7 by capillary action, to facilitate its sensitization and to increase its sensitivity to light.

In Fig. 2 a plurality of plates 3 not capable of being wetted by molten selenium is connected in parallel to the supply wire 1, likewise a plurality of plates 4 not capable of being wetted by molten selenium is connected in parallel to the supply wire 2 and each plate 4 is located between two plates 3. Between each plate 3 and the adjacent plate 4 is located a plate 5 capable of being wetted by molten selenium and insulated from the plates 3, 4 by mica plates 6. 7 again indicates the outline of the selenium layer.

In Fig. 3 instead of individual plates 3 and 4 not capable of being wetted by molten selenium, pairs of such parallel plates are provided. All the pairs of plate 3 are connected in parallel to the supply conductor 1, the pairs of plates 4 are connected in parallel to the supply conductor 2. Between the two plates of each pair 3 or 4 is located a plate 5 capable of being wetted by molten selenium which is not insulated from the plates of such pair, but is not directly connected to the supply wires 1, 2. Adjacent pairs of plates 3, 4 are insulated from each other by insulating mica plates 6. 7 indicates the outline of the selenium layer.

What I claim is:

1. A selenium cell of the condenser type comprising supply wires, conductive plates set on edge and parallel to each other, mica plates interposed between and insulating at least part of the conducting plates from each other, some of the conductive plates being capable of being wetted by molten selenium and the remainder of the conductive plates being incapable of being wetted by molten selenium, the supply wires being directly electrically connected with groups insulated from each other of the conductive plates incapable of being wetted by molten selenium and the conductive plates capable of being wetted by molten selenium being out of direct electric connection with the said supply wires.

2. A selenium cell of the condenser type comprising supply wires, conductive plates set on edge and parallel to each other, mica plates interposed between and insulating at least part of the conducting plates from each other, some of the conductive plates being capable of being wetted by molten selenium and the remainder of the conductive plates being incapable of being wetted by molten selenium, the supply wires being directly electrically connected with groups insulated from each other of the conductive plates incapable of being wetted by molten selenium and the conductive plates capable of being wetted by molten selenium being out of direct electric connection with the said supply wires, the conductive plates capable of being wetted by molten selenium being located at the sides of the conductive plates incapable of being wetted by molten selenium and insulated therefrom and from each other by mica plates.

3. A selenium cell of the condenser type comprising supply wires, conductive plates set on edge and parallel to each other, mica plates interposed between and insulating at least part of the conducting plates from each other, some of the conductive plates being capable of being wetted by molten selenium and the remainder of the conductive plates being incapable of being wetted by molten selenium, the supply wires being directly electrically connected with groups insulated from each other of the conductive plates incapable of being wetted by molten selenium and the conductive plates capable of being wetted by molten selenium being out of direct electric connection with the said supply wires, the individual plates incapable of being wetted by molten selenium of each of the said groups being connected in parallel to the respective supply wires and the conductive plates capable of being wetted by molten selenium being located at the sides of the conductive plates incapable of being wetted by molten selenium and insulated therefrom and from each other by mica plates.

4. A selenium cell of the condenser type comprising supply wires, conductive plates set on edge and parallel to each other, mica plates interposed between and insulating at least part of the conducting plates from each other, some of the conductive plates being capable of being wetted by molten selenium and the remainder of the conductive plates being incapable of being wetted by molten selenium, the supply wires being directly electrically connected with groups insulated from each other of the conductive plates incapable of being wetted by molten selenium and the conductive plates capable of being wetted by molten selenium being out of direct electric connection with the said supply wires each of the said groups comprising at least one pair of conductive plates incapable of being wetted by molten selenium such plates of each pair being separated from each other by a conductive plate capable of being wetted by molten selenium and the pairs of one group connected in parallel to one supply wire being separated and insulated from the pairs of the other group connected in parallel to the other supply wire by mica plates interposed between such pairs.

In testimony whereof I have affixed my signature.

HANS THIRRING.